(12) United States Patent
Jung et al.

(10) Patent No.: US 6,362,857 B1
(45) Date of Patent: Mar. 26, 2002

(54) VIDEO SIGNAL DISTRIBUTION DEVICE WITH STORAGE FOR ASSIGNMENT PRESCRIPTION DATA

(75) Inventors: Frank Jung, Griesheim; Rolf Grzibek, Frankfurt/Main, both of (DE)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/194,641

(22) PCT Filed: Mar. 31, 1998

(86) PCT No.: PCT/IB98/00472

§ 371 Date: Dec. 1, 1998

§ 102(e) Date: Dec. 1, 1998

(87) PCT Pub. No.: WO98/44724

PCT Pub. Date: Oct. 8, 1998

(30) Foreign Application Priority Data

Apr. 1, 1997 (DE) .......................................... 197 13 533

(51) Int. Cl.$^7$ .......................... H04N 5/222; H04N 9/74; H04N 5/268
(52) U.S. Cl. ......................... 348/722; 348/705; 348/595
(58) Field of Search .................................. 348/722, 595, 348/705, 578; 455/3.01; H04N 9/74, 5/222, 5/268

(56) References Cited

U.S. PATENT DOCUMENTS 5,036,395 A * 7/1991 Reimers ...................... 348/722

FOREIGN PATENT DOCUMENTS

DE 295 08817 * 9/1995

* cited by examiner

*Primary Examiner*—Sherrie Hsia
(74) *Attorney, Agent, or Firm*—Joseph S. Tripoli; Harvey D. Fried; Francis A. Davenport

(57) ABSTRACT

In a video signal distribution device (1) having operating elements (14, 15) and a control device (13) for evaluating the operating state of the operating elements (14, 15) and for forming a video output signal from a multitude of video source signals (7, 19) in dependence upon the operating state, the video output signal being made available at an output (12) of the device, there is provided, for second and third utilizers, that the video signal distribution device (1) includes a storage device (13) for storing an assignment prescription for assigning at least a second operating state to each evaluated operating state, and that the control device (13) generates at least a second video output signal in conformity with the second operating state predetermined by the storage device, and makes this second video output signal available at at least a second output (24).

8 Claims, 1 Drawing Sheet

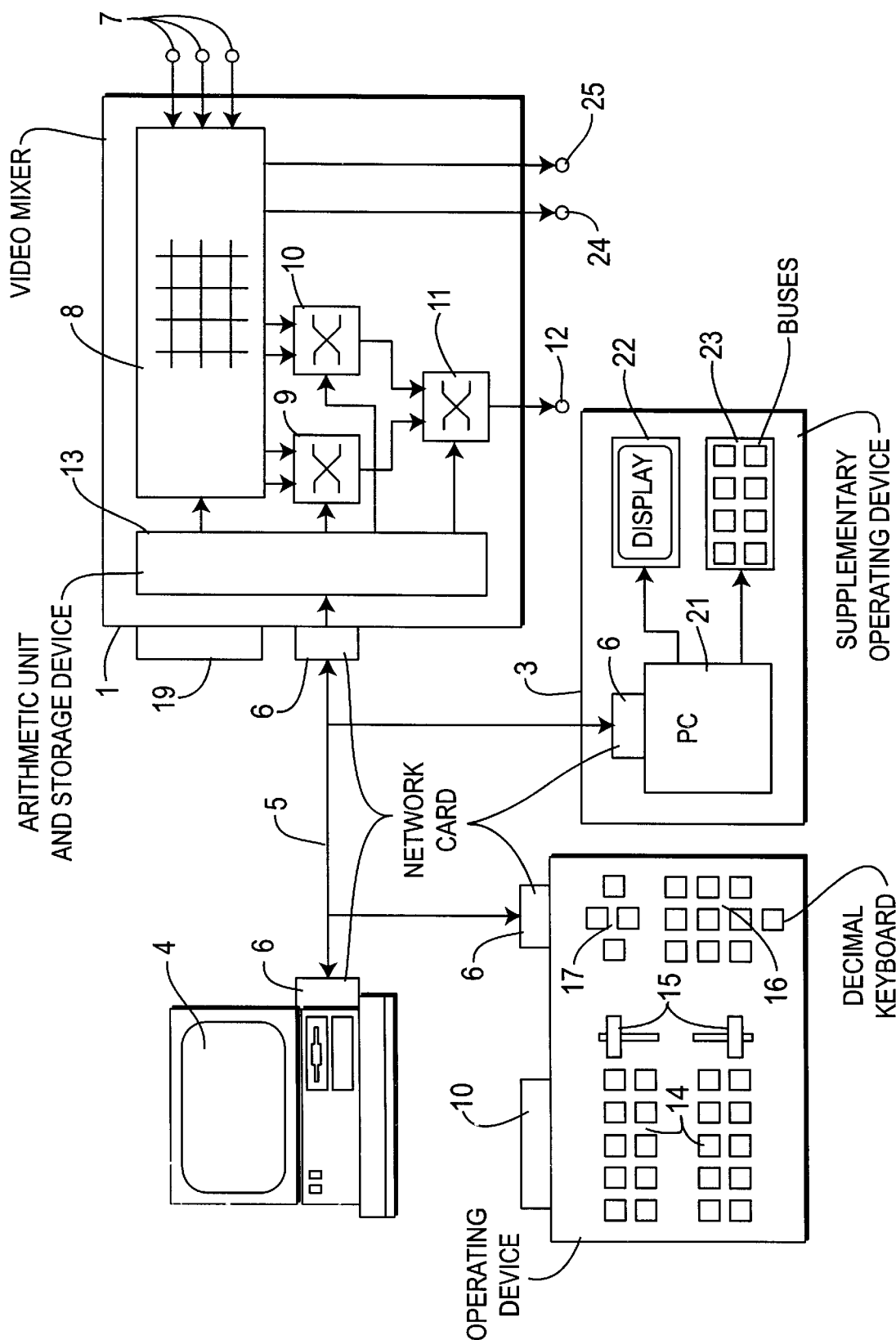

VIDEO SIGNAL DISTRIBUTION DEVICE WITH STORAGE FOR ASSIGNMENT PRESCRIPTION DATA

BACKGROUND OF THE INVENTION

1. Field of the Invention

The invention relates to a video signal distribution device having operating elements and a control device for evaluating the operating state of the operating elements and for forming a video output signal from a multitude of video source signals in dependence upon the operating state, said video output signal being made available at an output of the device.

2. Description of the Related Art

Usually, media events are recorded by a multitude of television cameras so as to be able to show the event from different angles and distances. Moreover, single scenes can, for example, be repeated in slow motion or provided with trick effects, etc., by means of recording apparatuses, effect apparatuses and other additional apparatuses. A selection must be made from the multitude of the video source signals which are available in this way, this selected video source signal, or the video mixing signal composed of a selection of the video source signals available, being passed on to a user.

Particularly because of the new media fields created by the admission of private providers, it has now become a need to supply different providers of one and the same media event with different video signals.

SUMMARY OF THE INVENTION

It is an object of the invention to make different video output signals available to a multitude of clients in a possibly simple and low-cost manner.

This object is achieved in that the video signal distribution device comprises a storage device for storing an assignment prescription for assigning at least a second operating state to each evaluated operating state, and in that the control device generates at least a second video output signal in conformity with the second operating state predetermined by the storage device, and makes said second video out put signal available at at least a second output.

The use of a stored assignment prescription provides the possibility of operating a video signal distribution device in the conventional way, in which it is reliably ensured, with reference to the stored assignment prescription, that the video output signal, which is composed for a certain client, is exclusively composed of the video source signals assigned to said client. The assignment prescription may take, for example, the different utilization rights of single clients into account. In so far as the person operating the video signal distribution device selects a video signal for which a client has no right of utilization, the respective client may be assigned a substitution signal according to his right of utilization. The main advantage of the solution according to the invention is, particularly, that the distribution of the video signals to a multitude of clients by means of only one video signal distribution device can be performed without additional numbers of operating personnel.

These and other aspects of the invention are apparent from and will be elucidated with reference to the embodiments described hereinafter.

BRIEF DESCRIPTION OF THE DRAWINGS

In the drawing:

FIG. 1 is a block diagram of a mixing device.

DESCRIPTION OF THE PREFERRED EMBODIMENT

In the mixing device shown in FIG. 1, a video mixer 1, an operating device 2, a supplementary operating device 3 and a personal computer 4 are interconnected via a local network 5, for example, via a Cheaper net. The personal computer 4 is optional and does not need any further description to explain the invention. Each of the connected apparatuses has an interface in the form of a network card 6.

The mixer 1 is also known per se. However, for the sake of clarity, for example inputs 7 for video signals, a crossbar 8 and fader circuits 9, 10, 11 and an output 12 are shown. The crossbar 8 and the fader circuits 9 to 11 are controlled by an arithmetic unit/storage device 13 which converts commands received via the local network into setting signals for the crossbar 8 and the fader circuits 9 to 11, and supplies status information from the mixing device to the other components via the local network 5.

In the implementation according to the invention, the mixer 1 has two additional outputs 24 and 25 which are provided for connecting the second utilizer. Internally, the additional outputs 24, 25 are connected to their own output bar of the crossbar 8.

The operating device 2, which is also of a known type, comprises keys 14 for selecting the video signals to be mixed, fader controls 15 and a series of other operating elements which are not shown in FIG. 1. Such operating elements are used, for example, for selecting trick figures (key patterns) or for adjusting chrominance signal values for the chromakey or color area-generating signals (matte signals). These are signals which represent an essentially single-color or two-color area with continuous or trick pattern-controlled color transitions and, if required, may be used as background signals or for filling up other areas in the picture. For entering numerical values, the operating device 2 is further provided with a decimal keyboard 16. Video recorders, laser discs, disc recorders or video-effect apparatuses may also be operated, particularly, positioned and switched to the recording or reproducing mode by the operating device. To this end, the operating device 2 shown is provided with a plurality of keys 17.

Both the operating device 2 and the mixer 1 have a plurality of ports 18, 19, via which further devices can be connected and controlled such as, for example, external crossbars, video recorders and video-effect devices.

The supplementary operating device 3 essentially comprises a personal computer 21 to which a picture display device 22 and an input device 23 are connected. The input device 23 may be a keyboard. However, a mouse or a trackball may be used instead or as additional devices.

The video source signals which are applied to the mixer 1 are a plurality of television camera signals, for example, for football matches: a television camera for the long shots (Q1), a television camera (Q2) for the close-ups of players, television cameras behind the goals and in the corners (Q3) (for the sake of clarity, a plurality of video source signals of the same type is hereinafter described as a single video signal), television cameras for shots of the trainer (Q9), a television camera in a helicopter (Q11), television cameras for generating HDTV signals (Q12) and two playback devices (Q14), a slow-motion unit (Q16) and a super-slow-motion unit (Q17). The embodiment features a so-called first utilizer who has the utilization rights of all video signal sources, a second utilizer who has neither the right of the HDTV signals (Q12) nor the video signals of the helicopter camera (Q11), nor the super-slow- motion display (Q17), and a third utilizer who has only the rights of the long shots and playback.

The invention is based on the recognition that signal sources to which a second utilizer and a third utilizer are not entitled should be replaced by a substitution signal to which the second and third utilizers are entitled simultaneously with the mixing of the video signals provided for the first utilizer and without additional operating costs. The first row of the following Table shows the original signal sources Q1 . . . Q17 available for the first utilizer A1. The second row shows the substitution signal for the second utilizer A2 below each original signal source. The third row of the Table shows the substitution signal source assignment for the third utilizer A3.

| A1 | Q1 | Q2 | Q3 | Q9 | Q11 | Q12 | Q14 | Q16 | Q17 |
|----|----|----|----|----|-----|-----|-----|-----|-----|
| A2 | Q1 | Q2 | Q3 | Q9 | Q1  | Q1  | Q14 | Q16 | Q17 |
| A3 | Q1 | Q1 | Q1 | Q1 | Q1  | Q1  | Q14 | Q14 | Q14 |

In the second row, for example, the column Q11, which corresponds to the helicopter television camera signal, shows the video source signal (Q1) of the long shots, and the column representing the super-slow motion (Q17) shows the video source signal of the slow motion (Q16). In the third row, the video source signal of the long shots Q1 is shown for all television camera source signals (Q1-Q12) and the video source signal Q14 of the first playback device is shown for the other source signals (Q14-Q17).

For easier operation, arbitrary assignment prescriptions before the start of mixing are entered into the personal computer 4, or a previously stored assignment prescription is called forward from the arithmetic unit/storage device 13. The relevant selected assignment prescription is applied via the network 5 to the arithmetic unit/storage device 13 of the mixer 1. During production, key statuses of the keys 14 and settings of the fader controls 15 of the operating device are continuously supplied to the arithmetic unit/storage device 13 of the mixer via the network. The arithmetic unit/storage device 13 evaluates the key statuses and settings of the fader controls and controls in known manner the crossbar 8 and the fader circuits 9–11. When preparing a fading operation, the operator at the operating panel 2 selects the video input signal to which the fade-over should be made by means of an allocation key. By pressing the corresponding allocation key, the input bar of the crossbar 8 corresponding to the signal source selection is connected to the output bar of the crossbar 8 to which the selected fader circuit 9 or 10 is connected. In the implementation of the arithmetic unit/storage device 13 according to the invention, this unit determines the substitution signal provided for the relevant preselected source signal for the second and third utilizers on the basis of the allocation table. As soon as the mixing lever is moved and passes more than half of the newly selected signal, the arithmetic unit/storage device 13 connects the input bars of the relevant substitution signal to the output bars of the second and third utilizers and the previously existing connection is eliminated. For example, if there is a fade-over from a long shot (Q1) to a close-up (Q2) of a player, the video signal of the player (Q2) appears in this way at the output 24 but the video signal (Q1) of the long shot remains at the output 25 because the client of this video signal does not have any rights of utilizing the close-up.

In a further embodiment of the invention, fader circuits are also used for the second and third utilizers, these fader circuits being controlled parallel to the fader circuits of the first utilizer so that soft fadings are thus possible for second and third utilizers.

What is claimed is:

1. A video signal distribution device having operating elements and a control device for evaluating an operating state of the operating elements, and for forming a video output signal from a multitude of video source signals in dependence upon the operating state, said video output signal being made available at an output of the device, characterized in that the video signal distribution device comprises a storage device for storing an assignment prescription for assigning at least a second operating state to each evaluated operating state, and in that the control device generates at least a second video output signal in conformity with the second operating state predetermined by the storage device, and makes said second video output signal available at at least a second output.

2. A video signal distribution device as claimed in claim 1, characterized in that said video signal distribution device further comprises an external input apparatus for entering the assignment prescription.

3. A video signal distribution device as claimed in claim 1, characterized in that the video signal distribution device comprises a crossbar, and at least one fading device, said control device controlling the crossbar.

4. A video signal distribution device as claimed in claim 3, characterized in that the control device controls the crossbar such that at least one of a plurality of output bars of the crossbar is connected to an input bar of the crossbar corresponding to the assignment prescription when output signal of the at least one fading device is faded over from a first output bar of the crossbar to another output bar.

5. A video signal distribution device comprising:

operating elements;

a control device configured to evaluate an operating state of the operating elements, configured to form a video output signal from a multitude of video source signals in dependence upon the operating state, and configured to provide the video output signal at a first output;

a storage device configured to store an assignment prescription assigning at least a second operating state to each evaluated operating state, wherein the control device is configured to generate at least a second video output signal determined by the assignments prescription stored in the storage device, and is configured to make the second video output signal available at least at one of the first output and a second output.

6. The video signal distribution device of claim 5, comprising an external input apparatus configured to enter the assignment prescription.

7. The video signal distribution device of claim 5, comprising a crossbar, and at least one fading device, wherein the control device is configured to control the crossbar.

8. The video signal distribution device of claim 7, wherein the control device is configured to control the crossbar such that at least one of a plurality of output bars of the crossbar is connected to an input bar of the crossbar which corresponds to the assignment prescription when the output signal of the at least one fading device is faded over from a first output bar of the crossbar to another output bar.

* * * * *